UNITED STATES PATENT OFFICE.

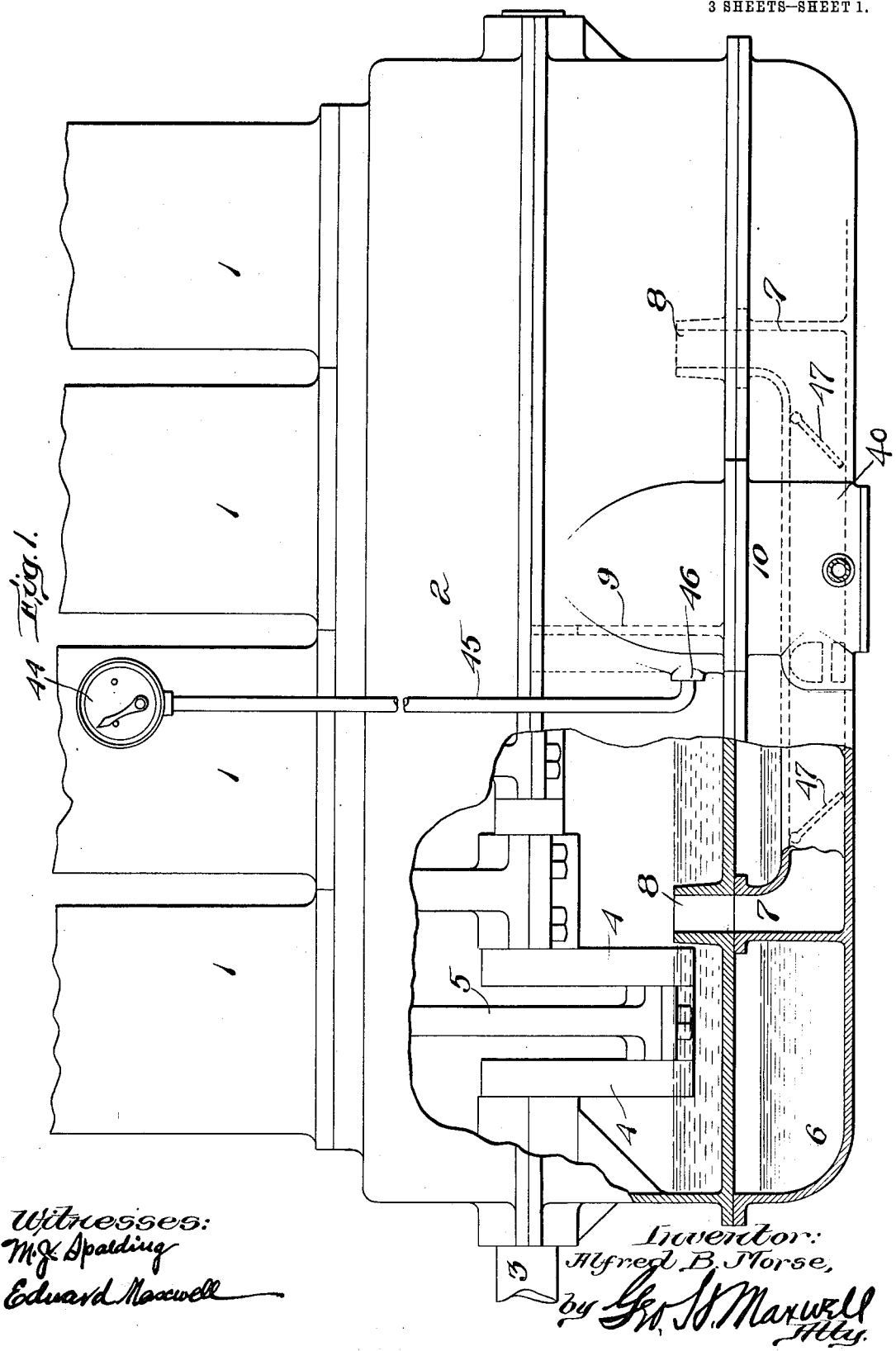

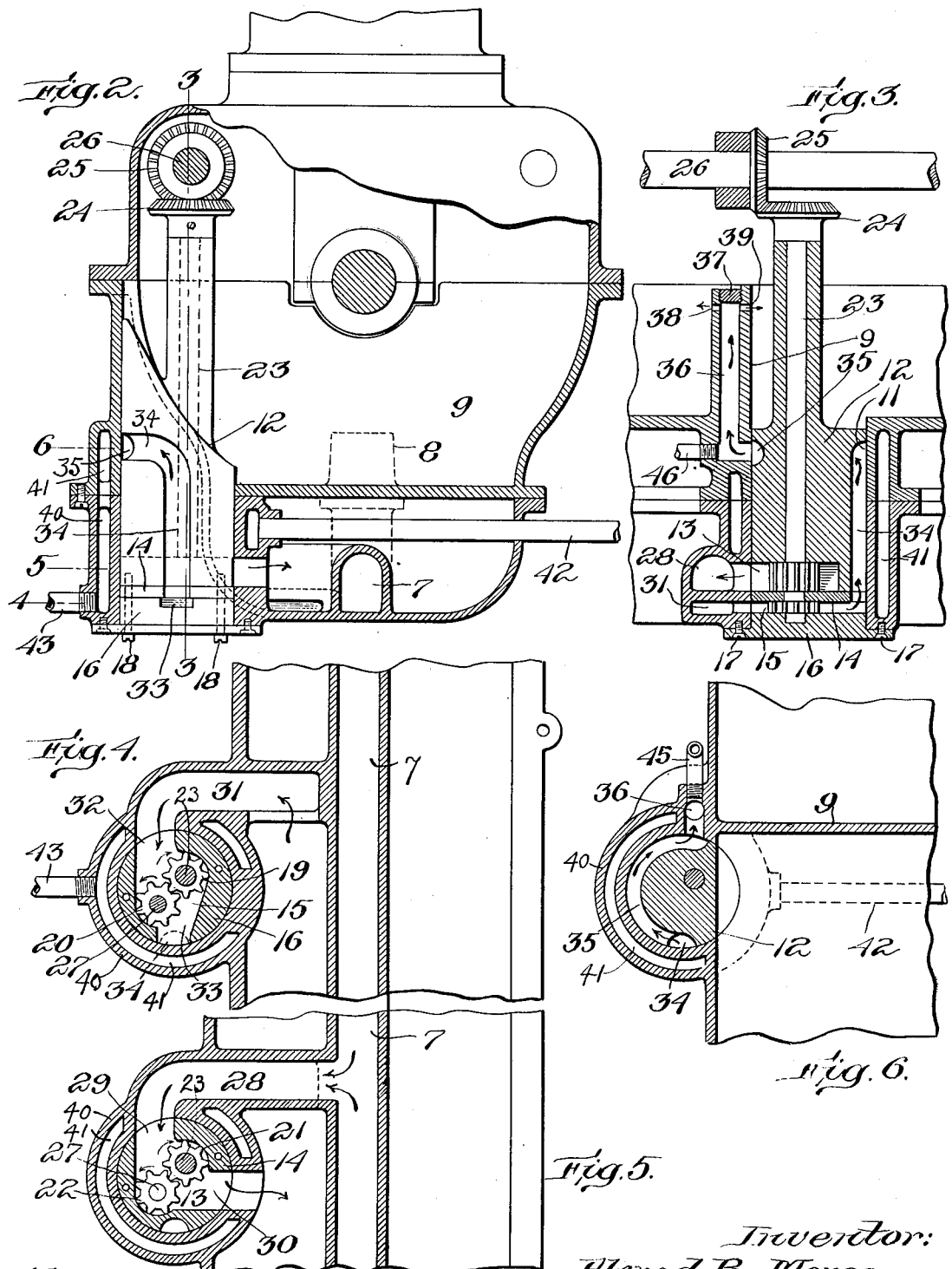

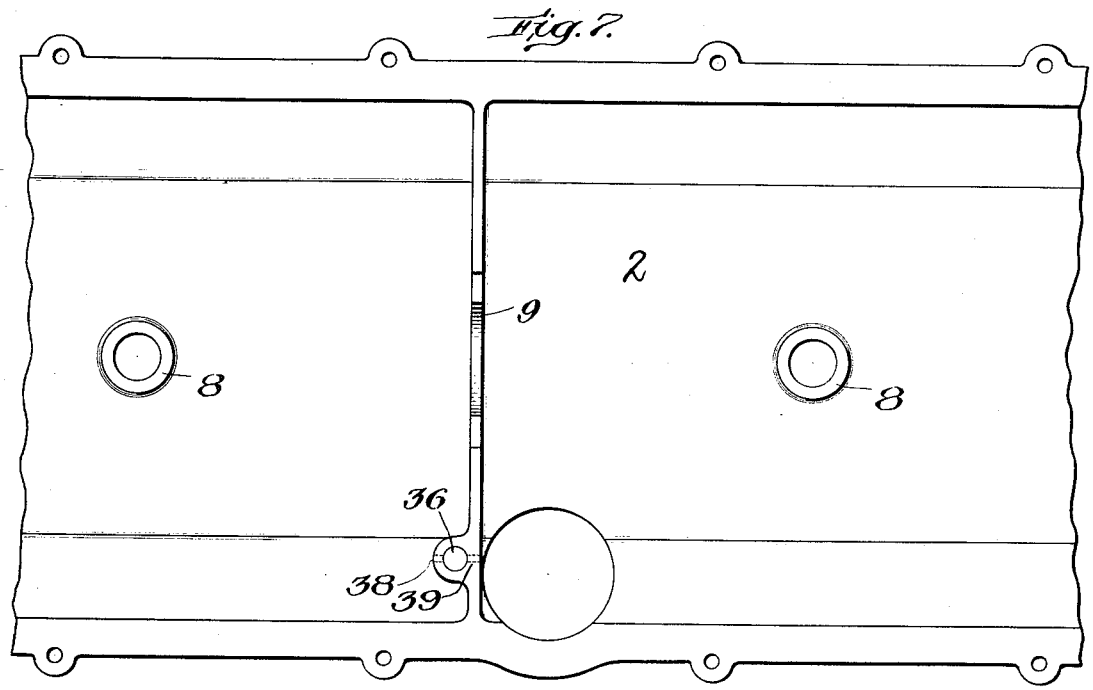
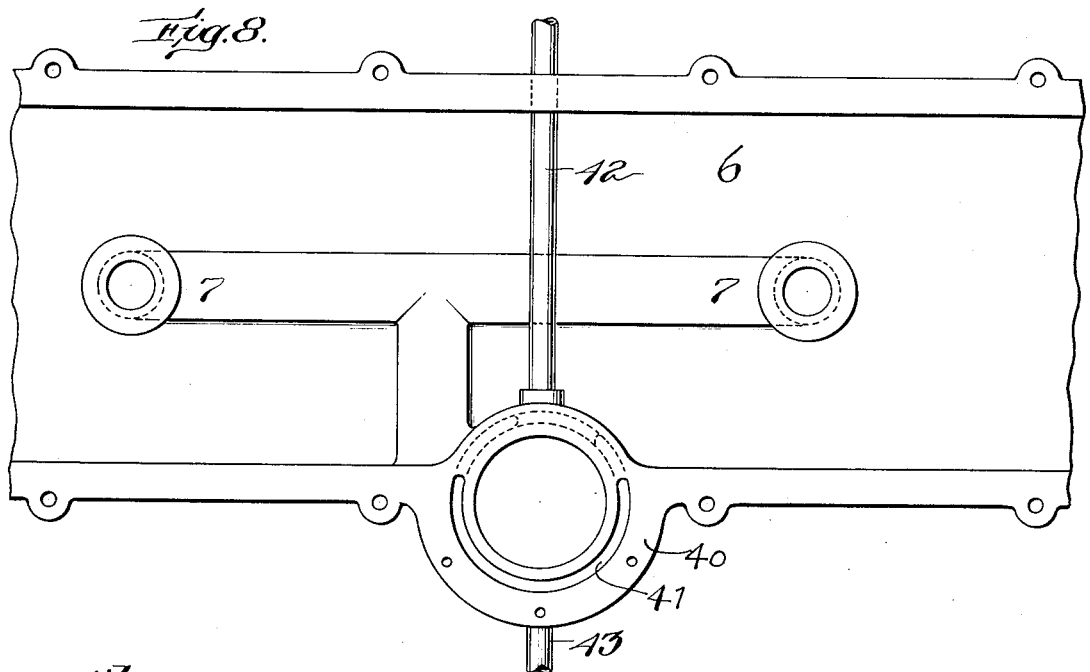

ALFRED B. MORSE, OF SOUTH EASTON, MASSACHUSETTS.

AUTOMATIC LUBRICATOR FOR MOTOR-CAR ENGINES.

1,000,188.   Specification of Letters Patent.   Patented Aug. 8, 1911.

Application filed March 7, 1908. Serial No. 419,737.

*To all whom it may concern:*

Be it known that I, ALFRED B. MORSE, a citizen of the United States, residing at South Easton, in the county of Bristol and State of Massachusetts, have invented an Improvement in Automatic Lubricators for Motor-Car Engines, of which the following description, in connection with the accompanying drawings, is a specification, like letters on the drawings representing like parts.

In modern hydrocarbon-explosive engines, and especially in modern high-speed automobile construction, the proper lubrication of the engine is of vital importance, and my invention aims to simplify and render certain, uniform and reliable this important feature of the engine. To this end I aim to do away with the expensive, complicated and inefficient system of small copper pipes which are at present employed for delivering oil from the oil tank through sight-feed oilers to the desired parts of the engine, said pipes being not merely expensive and difficult to understand and to repair, but tending to clog and cease to flow in cold weather or on account of thick, dirty, gummy oil, or to deliver an excess of oil at times, thereby causing the car to smoke. My invention not only eliminates all these pipes, but maintains the oil always at a given level and hence prevents smoking. I provide an oil supply in the crank chamber, into which the cranks dip to just the right extent to keep the engine properly lubricated, the rapid splashing of the cranks dividing the oil into a spray or mist of oil, which gives perfect lubrication of all moving parts without any danger of excess, inasmuch as the oil is always maintained at exactly the right level. It is not new to employ a splash system of lubrication, but it is new to maintain a proper level at all times, irrespective of the position of the vehicle, whether going up a side hill or transversely thereof, or upset, and I accomplish this automatically without indicators, and so that there is always a proper level at each end of the crank case, whatever may be the operative inclination of the vehicle. This level is due to an automatic circulation system in connection with a supply tank or chamber just below the crank chamber. Instead of providing free, open communication between said two chambers, I provide a regulated communication which permits only a predetermined passage of oil in one direction and does not permit an automatic return of oil in the other direction to the crank chamber. A further advantage of this arrangement is that thereby a larger quantity of oil may be conveniently carried, in proper thin, free running condition.

Preferably the operating mechanism of my invention is jacketed with hot water from the engine circulation or with hot-air from the exhaust pipe, whereby the oil and operating parts are kept properly warm at all times so that even in the coldest weather the oil is kept thin and therefore nothing can clog.

In the drawings, in which I have shown a preferred embodiment of the invention, Figure 1 shows the same in rear elevation, parts being broken away for clearness of illustration and understanding of the invention; Fig. 2 is an end elevation showing the parts mainly in central transverse section; Fig. 3 is a vertical sectional view on the line 3—3 Fig. 2; Figs. 4, 5, and 6 are horizontal sections taken respectively on the lines 4, 5, and 6, Fig. 2; and Figs. 7 and 8 are plan views showing respectively the crank chamber or intermediate section of the casing and the oil reservoir or bottom chamber.

It will be understood that my invention is not restricted to any particular kind of engine or field of work, although primarily intended for automobile motors, and accordingly, to make my invention readily apprehended, I have shown the same in connection with an ordinary four-cylinder high-speed engine, such as is commonly found in automobiles or motor cars or boats. As my invention relates only to the lubrication, I have omitted to show the details of the engine, having indicated four cylinders 1, mounted above a crank case 2 in which is journaled the crank shaft 3 driven in usual manner by cranks 4 and connecting links or piston rods 5 from the cylinder pistons. Directly beneath the crank case 2 I mount an oil reservoir or chamber 6. Communication between the two is provided by cored passages or ports 7, preferably formed as a part of the two castings constituting the two chambers, these tubular passages terminating in overflow ends 8, at their upper ends at exactly the level which it is desired the oil shall occupy in the crank chamber, one overflow being provided for each compartment of the crank chamber, two thereof being herein shown, separated by a partition 9 in order that the oil may not be permitted to run all to one end when the vehicle tips either sidewise or endwise. The oil circulation ports 7 deliver the oil to automatic pumping means 10 in the oil chamber for maintaining a continuous flow of oil from the latter into the crank chamber. The oil, however, is not pumped directly, but is first pumped or otherwise delivered from the ports 7 to the chamber 6, and then is subsequently pumped from the chamber 6 for delivery back to the crank case 2. As the pump is centrally located between the overflows, and the passages or ports 7 are closed except at said overflows and the pumps, there is no chance for the oil to flow back into the crank case except through the pump. No matter if the engine is tipped extremely it cannot cause any extra flow of oil from the oil chamber 6 into the case 2. It cannot cause any flow whatever. According to my invention the ports 7 of themselves cannot have any influence whatever in preventing an excess of oil in the crank case, and cannot of themselves withdraw any oil from the crank case, nor deliver any oil to the oil receptacle, as the interposed pump prevents the free flow of oil either to or from the crank chamber. If the pump is not running, the oil cannot flow through the ports 7, but in order to pass from the crank case to the supply chamber it must be pumped thereinto, as herein shown, in the preferred embodiment of my invention. I provide a return duct from the crank case to the pump and the latter discharges the oil into the oil chamber. In other words, this feature of my invention resides in making it impossible for the oil to run either from the crank case into the oil receptacle or from said receptacle into the crank case of its own accord, so that if the vehicle were capsized no oil would flow of itself from said receptacle into the crank case. Moreover, because of the partition 9 and the central position of the pump, there is always a proper supply of oil in both ends of the crank case irrespective of whether it is tipped or not.

Viewing Figs. 2–6 it will be seen that I provide a cylindrical pocket or vertical column 11 extending through the oil chamber into the crank chamber. Fitting snugly in this casing is a casting 12 having a chamber or cavity 13 at its lower end closed by a plate 14 provided on its under side with a chamber 15 closed by a head 16 bolted at 17 to the casing 11 and the whole held together by long bolts 18. In the cavity 15 are two intermeshing gears 19, 20, and in the cavity 13 are similar intermeshing gears 21, 22, the gears 19 and 21 being fast on a vertical shaft 23 whose upper end carries a bevel gear 24 driven by a corresponding gear 25 operated by any continuously movable portion of the engine, being herein shown as mounted on a cam shaft 26, which actuates the valve mechanism of the engine (not shown). The gears 20, 22 are mounted for convenience on a short stub shaft 27. The pump cavity 13 receives oil from the ports 7 through a connection 28 opening into a port 29 of the pump casting and delivers the oil through a port 30 to the oil chamber 6, while oil is delivered from the oil chamber or reservoir through a cast port or passage 31 and port 32 to the cavity 15 and thence through a port 33 to a duct or passage 34, 35, 36, the part 36 thereof being herein shown as formed in the partition 9, the upper end of said passage being plugged at 37 and provided with preferably small outlets 38, 39, said outlets being located above the overflows 8 and serving to direct small streams of oil continuously into the opposite compartments of the crank chamber 2. The part 34 of the oil passage is shown as a vertically extending cast groove or port in the periphery of the casting 12, and the part 35 is a peripheral groove in said casting, and the entire construction of the pump is such that in case it should become foul from any reason it can be almost instantly cleaned. All that is necessary in order to clean the passage 34, 35 is to remove the bolts 17, thereby permitting the pump to be lowered, and then the operator simply scrapes out the grooves 34, 35 with his finger, or swashes the entire pump in kerosene, without taking the pump apart, and then pushes the pump back into place. Similarly the oil supply portion of the pump may be readily cleaned by hand if desired by removing the head 16 from the rest of the pump, and the oil return portion of the pump may be cleaned by removing the plate 14. The oil return chamber 13 has preferably a considerably larger capacity than the oil supply chamber 15, one object of my invention being to make certain that there can never be an excess of oil in the crank case. Surrounding the lower or exposed portion of the pump is the hot air, (or gases from the explosions of the motor) water, or steam jacket 40, providing a passage 41 for said air, steam or hot water, connected with any convenient source, being provided for this purpose with an intake pipe 42 and outlet pipe 43 in the exhaust circuit, or hot water or steam circuit, of the engine circulation system. The jacketing of the oil supply is not restricted to the pump, although for most situations this is preferable and sufficient. Preferably also a pressure indicator 44 is connected by an air pipe 45 with the oil-delivery portion of the pump, being herein shown as connected at 46 to the passage 36 outside of the crank case, said indicator 44 being located conveniently for the observation of the motor driver. Also, preferably check valves 47, of any suitable kind, are interposed in the passages or ports 7 to prevent any back flow in the latter.

In use it will be readily understood that, even in the coldest weather, there can be no failure of lubrication on account of the chilling of the oil inasmuch as the oil is held right at the engine itself, and is maintained thin or limpid at all times by the hot-water jacketed pump, the latter maintaining the circulation continuously by being driven from some moving part of the engine, and the oil maintaining itself automatically at a uniform level because of the continuous flow of the oil in connection with the fixed overflows, barrier-pump, etc. The height of the oil in the crank chamber, as already stated, depends on the height of the overflows 8, which are fixed at just that height which experience has found proper for the best lubrication and avoidance of smoke at the muffler discharge, and as the cranks splash successively in the oil with great rapidity they subdivide a portion of the oil into a spray or mist like a fog, which keeps the surfaces of the moving parts perfectly lubricated and yet without any excess of lubrication and therefore without liability of producing smoke at the muffler discharge. I make no claim broadly to the idea of splashing the oil in this manner as that has been done before, but I believe it is new to maintain the oil at an unvarying level so that thereby the result of the splashing of the oil is kept absolutely uniform, while at the same time providing means to prevent the flooding of the crank case with oil from the oil chamber in case of an overturn of the vehicle. One of the practical results of this part of my invention is that it eliminates the disagreeable odorous smoking of the engine commonly experienced whenever there is an excess of oil. One of the principal objects of my invention, however, has been to devise a mechanism and system of oiling which does away with the small copper pipes or tubes at present commonly employed for conveying the oil from an oil pump through sight-feed oilers to the different parts which are to be lubricated and which is at the same time safe under all conditions of use and accident. The withdrawal of the oil from the crank case, as well as delivery of the oil to the crank case is mainly dependent upon the pump, and by having the oil pump simply arranged in connection with the crank case so that its sole office is to keep a predetermined level of oil in the latter, there is no chance of clogging or chilling, and the mechanism is rendered exceedingly simple. By having the oil chamber directly beneath the crank case so that the oil flows by gravity from the overflows 8, a minimum quantity of oil is used and there is no chance of waste as the oil is continually pumped over and over. By having the closed passages 7, no oil can flow back from the oil chamber even if the chamber should tilt in any direction. If any foreign substance should get into the oil, or the pumping apparatus should need cleaning, there are no delicate parts requiring that the machinery should be taken to a skilled mechanician, but the casting 12 is simply lowered and its grooves brushed out with a brush or with the finger, or the entire pump swashed in a bucket of gasolene or kerosene. If one of the gears should break, it may be removed with equal ease, as the parts are held together simply by the bolts 17, 18. Preferably the entire oil chamber and the contained ports or passages and pump case are made in one piece or casting, and scarcely any machine work is necessary. My aim has been to simplify and cheapen the cost of manufacture while at the same time increasing the efficiency of lubrication.

As already intimated, I do not intend to restrict my invention to the constructional details herein shown, as many changes in arrangement and combination of parts may be resorted to without departing from the spirit and scope of my invention.

Having described my invention, what I claim as new, and desire to secure by Letters Patent is:

1. In a lubricating system, the combination with a chamber containing the lubricant, of means for positively feeding the lubricant into and out from said chamber, with a differential in feeding capacity in favor of the outlet feed, the outlet conduit being located to maintain the lubricant at a predetermined level within the chamber.

2. In a lubricating system, the combination with a chamber containing the lubricant, of a differential pump for positively feeding the lubricant into and out from said chamber, with a differential in feeding capacity in favor of the outlet feed, the outlet conduit being located to maintain a predetermined level within the chamber.

3. In an apparatus of the kind described, the combination with the engine of a casing for a movable part of the engine, an oil supply chamber, and mechanism to maintain automatically a predetermined level of oil in said casing including means to prevent any oil flowing back directly from said chamber into said casing.

4. In an apparatus of the kind described, the combination of a crank case, an oil receptacle supplemental to the crank case, a return duct through which surplus oil may flow in passing from the crank case to the oil receptacle, and means for preventing the back flow of oil through said return duct to said crank case in case the crank case and oil receptacle are accidentally inverted.

5. In an apparatus of the kind described, the combination of a crank case, an oil receptacle supplemental to the crank case, oil circulation means for permitting the flow of oil from said case to said receptacle and from said receptacle back to said case, including an oil pump, and provision for a hot-water circulation system, including a jacket for maintaining the said pump warm while it is pumping the oil.

6. In an apparatus of the kind described, the combination of a crank case, an oil receptacle supplemental to the crank case, oil circulation means for permitting the flow of oil from said case to said receptacle and from said receptacle back to said case, including an oil pump, and a heating jacket surrounding said oil pump.

7. In an apparatus of the kind described, the combination with the engine and its crank, of a crank case into which the crank moves, an oil supply chamber for supplying said crank case with oil for the crank to splash into, an overflow for limiting the height of said oil and means for preventing the flow of oil through said overflow from said chamber to said case.

8. In an apparatus of the kind described, the combination with an engine and a movable part thereof, of an oil chamber into which said movable part moves, an oil supply chamber beneath said oil chamber, and pumping means for controlling the flow of oil in either direction between said chambers and maintaining a continuous circulation of oil between said chambers.

9. The combination with an engine having a movable part, an oil chamber into which said part moves for delivering oil to the engine, an oil supply chamber beneath said oil chamber, an overflow pipe from the latter to said supply chamber, and automatic means controlling the escape of oil from said pipe into said supply chamber and maintaining the oil chamber properly supplied with oil from the supply chamber.

10. The combination with an engine having a movable part, an oil chamber into which said part moves for delivering oil to the engine, an oil supply chamber adjacent said oil chamber, pumping means to pump the oil from said oil chamber into said supply chamber, and pumping means to pump the oil from said supply chamber back into the oil chamber.

11. The combination with an engine having a movable part, an oil chamber into which said part moves for delivering oil to the engine, an oil supply chamber adjacent said oil chamber, pumping means of large capacity to pump the oil from said oil chamber into said supply chamber, and pumping means of small capacity to pump the oil from said supply chamber back into the oil chamber, said oil chamber containing means to prevent the withdrawal therefrom of an undue amount of oil.

12. The combination with an engine having a movable part, of two chambers, into one of which said movable part moves to supply oil to the engine, a tubular opening through one of said chambers into the other, a pump fitting in said tubular opening, and operating means connecting said pump with the engine, ports being provided from said pump into the two chambers to permit the continuous circulation therein of oil by means of said pump.

13. The combination with an engine having a movable part, of two chambers, into one of which said movable part moves to supply oil to the engine, a tubular opening through one of said chambers into the other, a pump fitting in said tubular opening, and operating means connecting said pump with the engine, ports being provided from said pump into the two chambers to permit the continuous circulation therein of oil by means of said pump, said pump having oil passages formed in its outer surface which may be inspected and scraped upon the withdrawal of the pump from said opening.

14. The combination with an engine having a movable part, of two chambers, into one of which said movable part moves to supply oil to the engine, a jacketed tube providing a tubular opening through one of said chambers into the other, a pump fitting in said tubular opening, operating means connecting said pump with the engine, ports being provided from said pump into the two chambers to permit the continuous circulation therein of oil by means of said pump, and connections from said jacketed tube to the circulation system of the engine for maintaining the oil warm in the pump.

15. The combination with an engine having a movable part, an oil chamber into which said part moves for delivering oil to the engine, an oil supply chamber adjacent said oil chamber, pumping means to maintain a circulation of oil from the supply chamber into the other chamber, provision located within the said oil chamber for restricting the delivery of the oil from said pumping means, and an oil-pressure indicator connected adjacent said oil delivery for indicating externally the operative condition of the oil circulation.

16. An engine, having a crank, a crank case therefor, an oil supply chamber adjacent the crank case, a tubular casing extending transversely through the supply chamber and communicating with the interior of the crank case, a pump mounted for endwise removal in said tubular casing, connections from said pump to a moving part of the engine for operating the pump, said pump including a rotary shaft mounted endwise therein, intermeshing pumping gears driven by said shaft, ports and passages between said gears and said case and chamber for the removal of oil from the case into the chamber, and other intermeshing pumping gears driven by said shaft, and ports and passages between said second mentioned gears and said case and chamber for the delivery of oil from the chamber to said case.

17. In an apparatus of the kind described, an oil supply chamber, a transverse tubular casing therein, a pump body mounted for endwise removal in said casing, a gear cavity at one end of said body, a shaft journaled lengthwise in said body, intermeshing pumping gears mounted in said cavity and rotated by said shaft, a partition plate inclosing said gears, a closing head beyond said plate, a gear cavity between said plate and head, a second set of pump gears in said second mentioned cavity also rotated by said shaft, and ports and connecting passages from said two sets of pump gears to said chamber for the delivery of oil by one set of gears to the chamber and the removal of oil by the other set of gears from the chamber.

18. In an apparatus of the kind described, an engine having a movable part, an oiling chamber into which said part moves for oiling purposes, an oil supply chamber adjacent said oiling chamber, means for delivering oil from said oil supply chamber to the oiling chamber, and an overflow port or passage from said oiling chamber into said oil supply chamber closed excepting at its inlet in the oiling chamber and at its outlet in the supply chamber, and arranged to permit the flow of oil only from said oiling chamber to said supply chamber.

19. In an apparatus of the kind described, the combination with an engine and its cranks, of a crank case, an oil supply chamber adjacent thereto, and opposite ports or passages leading respectively from the opposite ends of the crank case into the middle of the supply chamber closed excepting at their inlet ends in the crank case and at their outlet at the middle of the supply chamber and containing means to prevent a back flow of oil in case the apparatus is inverted.

20. The combination with an engine and its cranks, of a crank case about the cranks, an oil supply chamber adjacent the crank case, a central pump in the oil chamber, overflow ports or passages from the opposite ends respectively of the crank case for conducting oil therefrom to said pump and thence delivering the oil into the supply chamber, and closed excepting at their opposite ends.

21. The combination with an engine and its cranks, of a crank case about said cranks, transversely divided into a plurality of compartments, means for withdrawing surplus oil from each compartment into the supply chamber, said withdrawing means being provided with means for preventing the reverse flow therethrough of the oil, and automatic means for maintaining oil delivery from the oil supply tank into each compartment of the crank case.

In testimony whereof, I have signed my name to this specification, in the presence of two subscribing witnesses.

ALFRED B. MORSE.

Witnesses:
M. J. SPALDING,
GEO. H. MAXWELL.